US008744696B2

(12) United States Patent
Choi

(10) Patent No.: US 8,744,696 B2
(45) Date of Patent: Jun. 3, 2014

(54) FULL CROWD DETENT APPARATUS OF WHEEL LOADER BUCKET

(75) Inventor: Ki Hong Choi, Gyeonggi-do (KR)

(73) Assignee: Doosan Infracore Co., Ltd., Incheon (KR)

( * ) Notice: Subject to any disclaimer, the term of this patent is extended or adjusted under 35 U.S.C. 154(b) by 0 days.

(21) Appl. No.: 13/513,366

(22) PCT Filed: Dec. 3, 2010

(86) PCT No.: PCT/KR2010/008611
§ 371 (c)(1),
(2), (4) Date: Jun. 1, 2012

(87) PCT Pub. No.: WO2011/068377
PCT Pub. Date: Jun. 9, 2011

(65) Prior Publication Data

US 2012/0239263 A1 Sep. 20, 2012

(30) Foreign Application Priority Data

Dec. 3, 2009 (KR) ........................ 10-2009-0118835

(51) Int. Cl.
*G06F 19/00* (2011.01)

(52) U.S. Cl.
USPC ............................................. 701/50; 702/151

(58) Field of Classification Search
None
See application file for complete search history.

(56) References Cited

U.S. PATENT DOCUMENTS 3,782,248 A * 1/1974 Fuzzell ....................... 91/358 A
4,099,449 A * 7/1978 Orimoto et al. ............. 91/358 A
5,000,650 A * 3/1991 Brewer et al. ................. 414/699
5,356,260 A * 10/1994 Ikari et al. ...................... 414/700
5,426,874 A 6/1995 Nakata et al.
6,064,933 A * 5/2000 Rocke ............................. 701/50
6,182,781 B1 * 2/2001 Beom ........................... 180/271
7,356,397 B2 * 4/2008 Porter ............................ 701/50
2007/0295147 A1 * 12/2007 Didier et al. .................... 74/519
2010/0226744 A1 * 9/2010 Trifunovic .................... 414/700

FOREIGN PATENT DOCUMENTS

KR 10-2008-0050011 6/2008
WO 2008-153532 12/2008

OTHER PUBLICATIONS

Search Report dated Aug. 29, 2011, written in Korean for International Application No. PCT/KR2010/008611, filed Dec. 3, 2010, 3 pages.

* cited by examiner

*Primary Examiner* — Helal A Algahaim
*Assistant Examiner* — Donald J Wallace
(74) *Attorney, Agent, or Firm* — John D. Veldhuis-Kroeze; Westman, Champlin & Koehler, P.A.

(57) ABSTRACT

Provided is a full crowd detent apparatus of a wheel loader bucket, and more particularly, a full crowd detent apparatus of a wheel loader bucket that can improve operator's joystick operation convenience by providing a full crowd detent function to full-crowd a bucket without operator's gripping a bucket operating joystick lever from a maximum dump position of the bucket up to a completion moment of a maximum full-crowd operation by controlling a power of an electromagnet by comparing an angle sensor value of a bucket detected from a rotary angle sensor that senses an angle at which a rotational shaft of the bucket rotates with an angle value of a predetermined bucket position (for example, full crowd and return to dig).

7 Claims, 5 Drawing Sheets

ELECTROMAGNET OFF SECTION IS CONSTANT DETERMINED BY TEST

FULL CROWD DETENT APPARATUS OF WHEEL LOADER BUCKET

This Application is a Section 371 National Stage Application of International Application No. PCT/KR2010/008611, filed Dec. 3, 2010 and published, not in English, as WO11/068377 on Jun. 9, 2011.

FIELD OF THE DISCLOSURE

The present disclosure relates to a full crowd detent apparatus of a wheel loader bucket, and more particularly, to a full crowd detent apparatus of a wheel loader bucket that can improve operator's joystick operation convenience by providing a full crowd detent function to full-crowd a bucket without operator's gripping a bucket operating joystick lever from a maximum dump position of the bucket up to a completion moment of a maximum full-crowd operation by controlling power of an electromagnet by comparing an angle sensor value of the bucket detected from a rotary angle sensor that senses an angle at which a rotational shaft of the bucket rotates with an angle value of a predetermined bucket position (for example, full crowd and return to dig).

BACKGROUND OF THE DISCLOSURE

A construction machine such as a wheel loader is frequently used for a work of transporting or loading soil. In more detail, after the wheel loader transports the soil up to a position near a transportation means such as a truck, the wheel loader raises a boom and thereafter, full-dumps a bucket to drop the soil to the transportation means. In addition, the wheel loader moves the bucket back to a return-to-dig position and drops the boom. Thereafter, the wheel loader moves to a place where the soil is accumulated, loads the soil in the bucket, and adjusts the bucket to a full-crowd position. Such work is repeated multiple times until the soil is filled in the transportation means. Therefore, a wheel loader operator should repeatedly perform an operation of raising and dropping the bucket to the transportation means.

FIG. 1 is a diagram illustrating configurations of a general wheel loader and a wheel loader detent apparatus in the related art.

As shown in FIG. 1, the general wheel loader includes a bucket 111, a bucket cylinder 112 for dumping or crowding the bucket 111, and a boom 113 for raising or dropping the bucket 111.

In order to facilitate the operation of the bucket 111 which the wheel loader raises and drops to the transportation means, the wheel loader detent apparatus in the related art includes a mechanism unit 114 that moves in conjunction with movement of the bucket 111, an electromagnet 123, a power 121 for supplying power to the electromagnet 123, a ground 124 for grounding the electromagnet 123, and a non-contact proximity switch 122.

The non-contact proximity switch 122 switches connection between the power 121 and the electromagnet 123 depending on whether or not the mechanism unit 114 is in the proximity of the non-contact proximity switch 122. That is, when the mechanism unit 114 is not in the proximity of the non-contact proximity switch 122, the non-contact proximity switch 122 connects the power 121 to the electromagnet 123. On the contrary, when the mechanism unit 114 is in the proximity of the non-contact proximity switch 122, the non-contact proximity switch 122 does not connect the power 122 to the electromagnet 123. Herein, the non-contact proximity switch 122 may include a metal sensor that can sense whether or not the mechanism unit 113 is in the proximity of the non-contact proximity switch 122.

While the non-contact proximity switch 122 is turned on and the power 121 is supplied to the electromagnet 123, when an operator makes a joystick lever 131 to be in the proximity of a crowd-direction electromagnet 123, the electromagnet 123 fixes the joystick lever 131 by using magnetic force by current of the power 121.

Thereafter, when the non-contact proximity switch 122 is turned off as the mechanism unit 114 moves while the joystick lever 131 is fixed, the power 123 is not supplied to the electromagnet 123, and as a result, the electromagnet 123 does not fix the joystick lever 131 and returns the joystick lever 131 to a neutral position.

As such, the wheel loader detent apparatus in the related art latches the joystick lever 131 by means of the electromagnet 123 when the wheel loader joystick lever 131 is positioned at an upper limit or lower limit position. In the detent apparatus of the wheel loader in the related art, when the mechanism unit 114 reaches a predetermined position, the power 121 of the electromagnet 123 is cancelled to return the joystick lever 131 to the neutral position. Herein, the predetermined position is a position 101 for loading a cargo. The detent apparatus of the wheel loader allows a working machine (for example, a bucket cylinder and a boom cylinder) to be arbitrarily driven by controlling the joystick lever 131 out of a detent section even though an operator does not consecutively maintain the position of the joystick lever 131.

A detent position of the wheel loader detent apparatus in the related art is one spot and is set as a return to dig (hereinafter, referred to as a 'loading position') 101 for loading the cargo. That is, the wheel loader detent apparatus serves to detent the bucket 111 to the loading position 101 during a dump or crowd operation.

FIG. 2 is an explanatory diagram of an electromagnet on/off operation from a full dump position to a full crowd position by the wheel loader detent apparatus in the related art.

As shown in FIG. 2, when the operator classifies an operation of raising or dropping the bucket 111 of a wheel loader to the transportation means, the operation is classified into a section 210 in which the electromagnet 123 is turned on and a section 220 in which the electromagnet 123 is turned off. The section 210 where the electromagnet 123 is turned on is from a full dump position 201 to a loading position 202 of the bucket 111. On the contrary, the section 220 where the electromagnet 123 is turned off is from the loading position 202 to a full crowd position 203.

In the section 210 where the electromagnet 123 is turned on, the non-contact proximity switch 122 supplies the power 121 to the electromagnet 123. Then, the electromagnet 123 fixes the joystick lever 131 by using the magnetic force of the electromagnet 123 when the joystick lever 131 is in the proximity of the electromagnet 123. That is, the joystick lever 131 is latched in a crowd direction by the electromagnet 123.

In the section 220 where the electromagnet 123 is turned off, the non-contact proximity switch 122 interrupts the supply of the power 121 to the electromagnet 123. Then, the electromagnet 123 returns the joystick lever 131 fixed during the section "210" to the neutral position. When the joystick lever 131 is returned to the neutral position, the bucket 111 which is driven by latching the joystick lever 131 during the section "210" stops at the loading position 202.

Herein, the non-contact proximity switch 122 cannot but interrupt the supply of the power 121 to the electromagnet 123 from the loading position 202 of the bucket 111 to the full crowd position 203. That is, the wheel loader detent apparatus in the related art cannot but set the detent position as only one position (loading position 202). Therefore, the wheel loader detent apparatus in the related art cannot provide a detent function at the full crowd position 203.

In this regard, the operator performs the driving of the wheel loader and the dumping and crowding works of the bucket 111 simultaneously. When there is no detent function at the full crowd position 203, the operator should move a handle of the wheel loader and the joystick lever 131 simultaneously, and thus, it is hard for the operator to easily perform the works.

The discussion above is merely provided for general background information and is not intended to be used as an aid in determining the scope of the claimed subject matter.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present disclosure is contrived to solve the problems, and an object of the present disclosure is to provide a full crowd detent apparatus of a wheel loader bucket that can improve operator's joystick operation convenience by providing a full crowd detent function to full-crowd a bucket without operator's gripping a bucket operating joystick lever from a maximum dump position of the bucket up to a completion moment of a maximum full-crowd operation by controlling power of an electromagnet by comparing an angle sensor value of the bucket detected from a rotary angle sensor that senses an angle at which a rotational shaft of the bucket rotates with an angle value of a predetermined bucket position (for example, full crowd and return to dig).

The objects of the present disclosure are not limited the aforementioned object. Therefore, other objects and advantages of the present disclosure which are not described will be able to be understood and will be more apparently appreciated by the exemplary embodiment of the present disclosure. Further, it will be able to be appreciated that the object and advantages of the present disclosure can be implemented by the means and the combination thereof described in the appended claims.

In order to achieve the object, according to a first aspect of the present disclosure, a full crowd detent apparatus of a wheel loader bucket includes: a bucket position holding unit configured to latch a joystick lever operating a bucket while a power is supplied; a bucket position detecting unit configured to detect the position of the bucket by acquiring a bucket angle value from an angle sensor detecting a rotational angle of the bucket; a bucket position judging unit configured to judge whether the detected position of the bucket is a loading position or a maximum crowd position; and a bucket detent controlling unit configured to control detent of the bucket by controlling the power supply according to the judged position of the bucket.

The present disclosure can improve operator's joystick operation convenience by providing a full crowd detent function to full-crowd a bucket without operator's gripping a bucket operating joystick lever from a maximum dump position of the bucket up to a completion moment of a maximum full-crowd operation by controlling power of an electromagnet by comparing an angle sensor value of the bucket detected from a rotary angle sensor that senses an angle at which a rotational shaft of the bucket rotates with an angle value of a predetermined bucket position (for example, full crowd and return to dig).

That is, as a full crowd detent function according to the present disclosure, the present disclosure can provide convenience to an operator of a wheel loader because the operator needs not grip the joystick lever up to a completion moment of a full-crowd operation for crowding the cargo after completion of loading the cargo at a loading position of the bucket.

Figure 1:
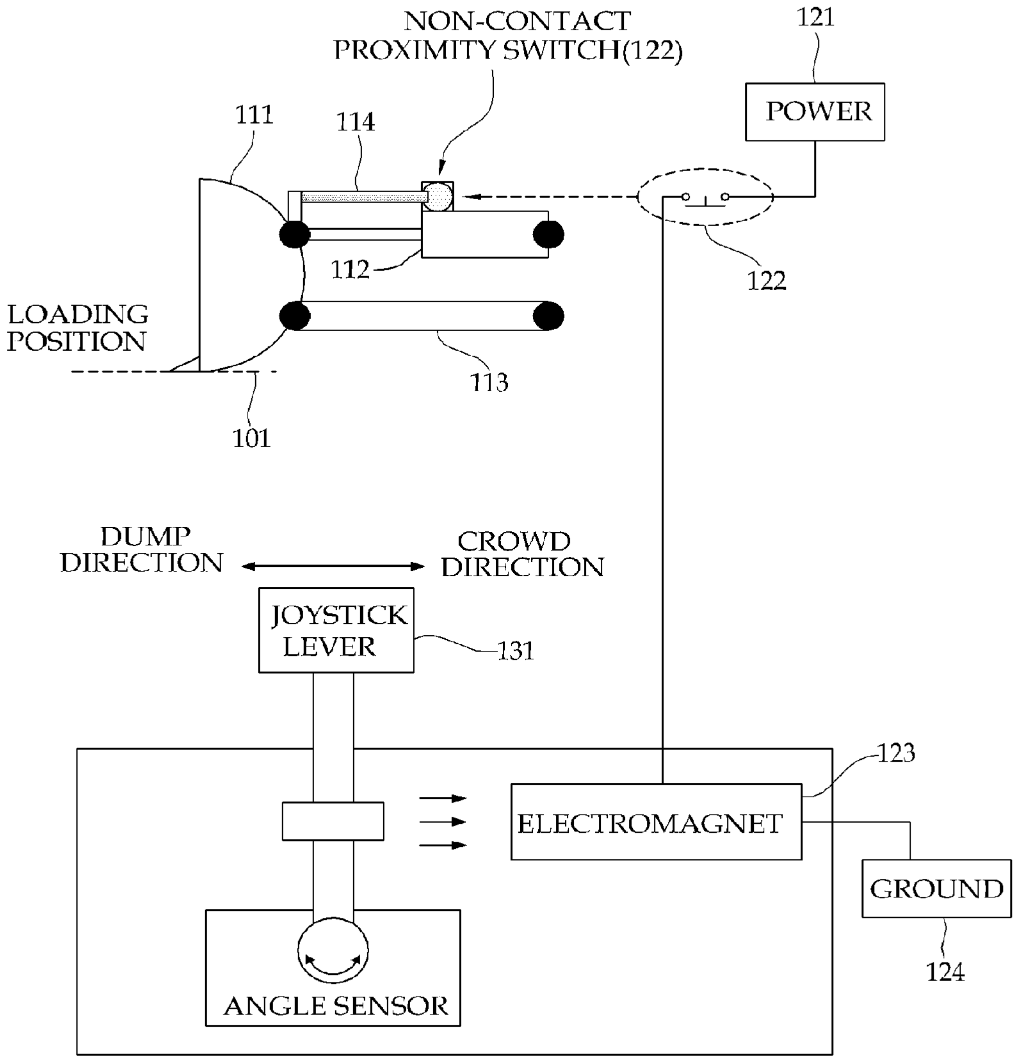
FIG. 1 PRIOR ART
FIG. 1 is a diagram illustrating configurations of a general wheel loader and a wheel loader detent apparatus in the related art.
Figure 2:
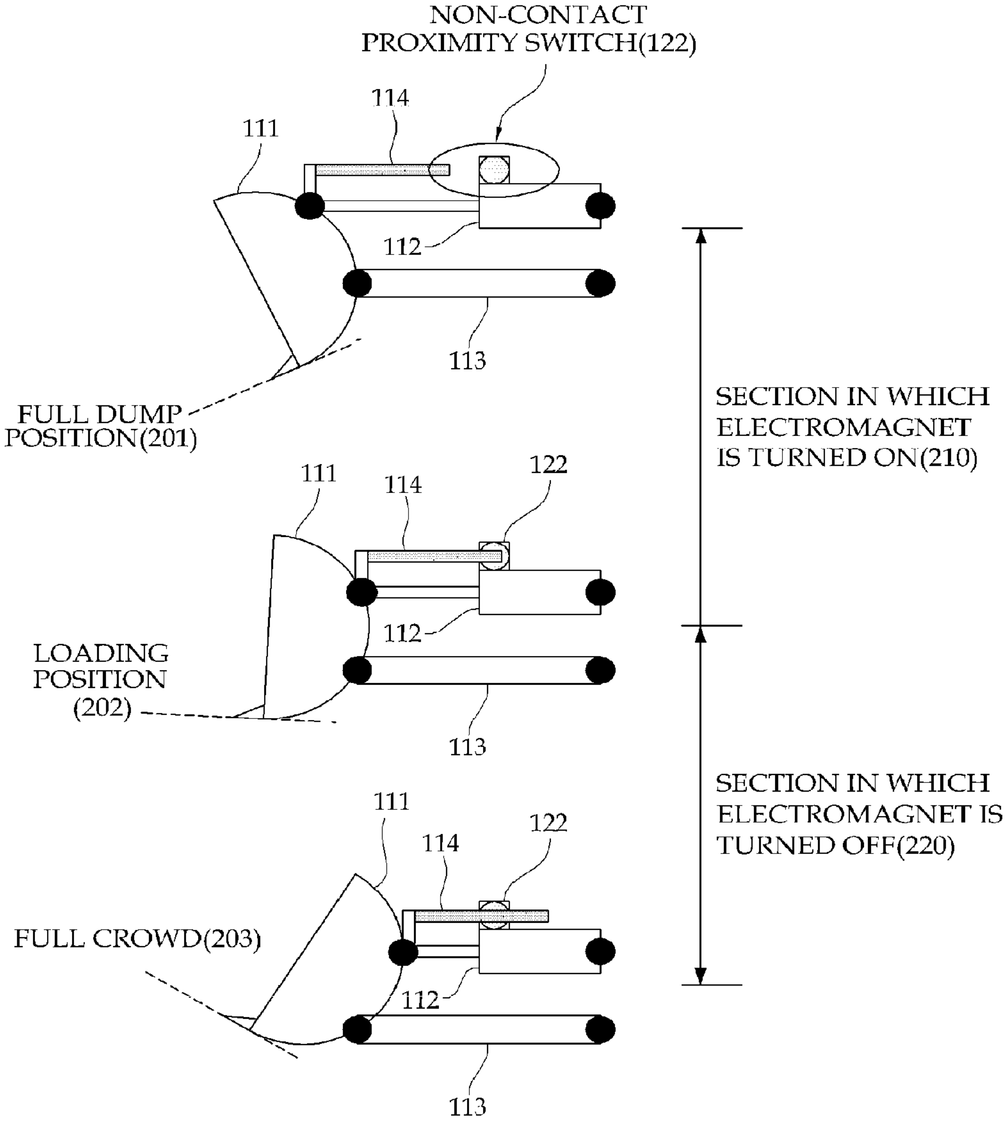
FIG. 2 PRIOR ART
FIG. 2 is an explanatory diagram of an on/off operation of an electromagnet from a full dump position to a full crowd position by the wheel loader detent apparatus in the related art.

300: Full crowd detent apparatus
310: Bucket position holding unit
320: Bucket position detecting unit
330: Bucket position judging unit
340: Bucket detent controlling unit
321: Rotary angle sensor
111: Bucket
115: Rotational shaft
131: Joystick lever
121: Power
124: Ground

DETAILED DESCRIPTION

Hereinafter, an exemplary embodiment of the present disclosure will be described in detail with reference to the accompanying drawings. The configurations of the present disclosure and the resulting operational effects will be apparently appreciated through the detailed description described as below. Prior to the detailed description of the present disclosure, it should be noted that the same components refer to the same reference numerals anywhere as possible in the drawings and well-known functions or constructions will not be described in detail since they may unnecessarily obscure the understanding of the present disclosure.

Figure 3:
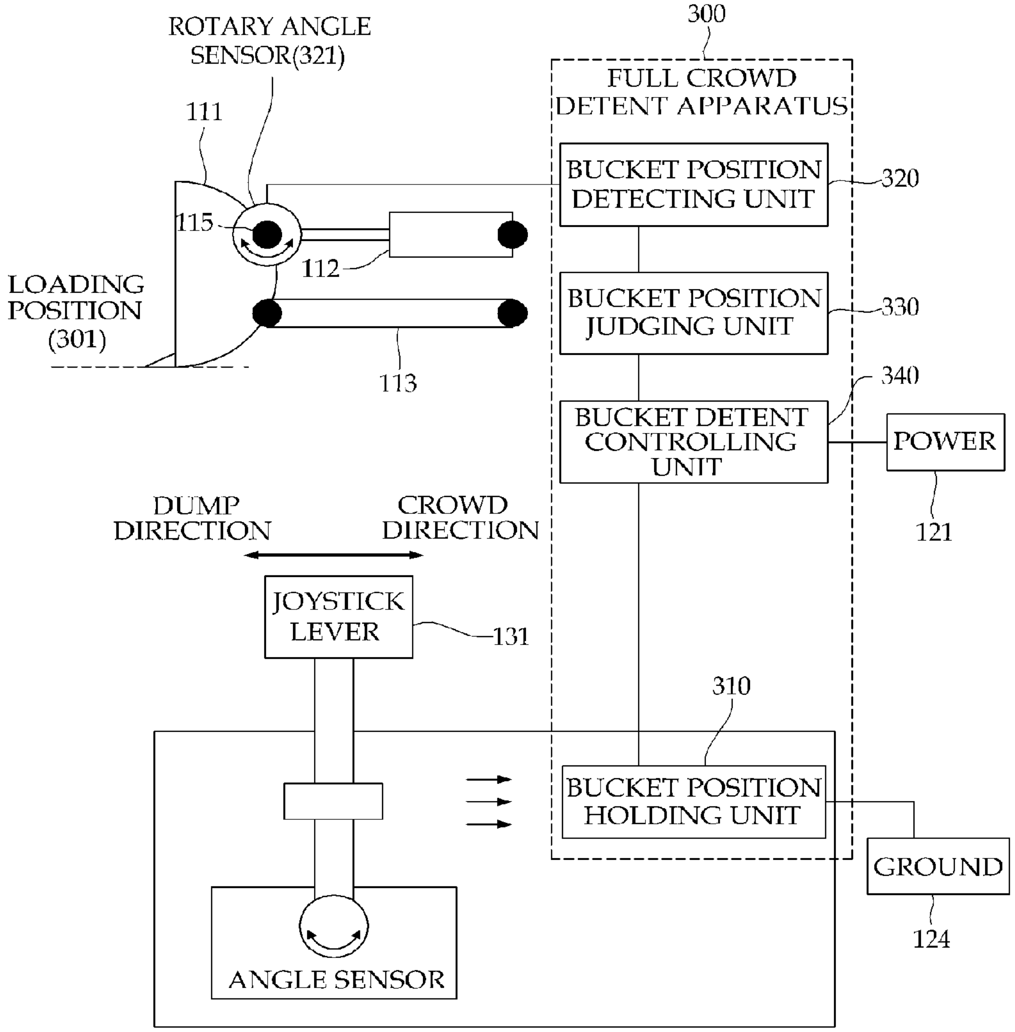
FIG. 3 is a configuration diagram of an exemplary embodiment of a full crowd detent apparatus of a wheel loader bucket according to the present disclosure.

FIG. 3 is a configuration diagram of an exemplary embodiment of a full crowd detent apparatus of a wheel loader bucket according to the present disclosure.

The full crowd detent apparatus 300 according to the present disclosure includes a bucket position holding unit 310, a bucket position detecting unit 320, a bucket position judging unit 330, and a bucket detent controlling unit 340.

Hereinafter, respective components of the full crowd detent apparatus 300 will be described.

The bucket position holding unit 310 fixes a joystick lever 131 by using magnetic force by current of a power 121 to latch the joystick lever 131 in one direction while the power 121 is supplied. For example, the bucket position holding unit 310 includes an electromagnet and turns on or off the electromagnet depending on the supply of the power 121 to latch the joystick lever 131 or return the joystick lever 131 to a neutral position.

The bucket position detecting unit 320 detects the position of a bucket 111 by acquiring a bucket angle value sensed by a rotary angle sensor 321 of a rotational shaft 115 capable of detecting the position of a bucket. Herein, the rotary angle sensor 321 is installed on the rotational shaft 115 capable of sensing an angle at which the bucket 111 rotates. The rotational shaft 115 may be multiple points according to a link structure to operate the bucket 111 of the wheel loader. Preferably, the rotational shaft 115 may be a rotational shaft of an uplink. The rotary angle sensor 321 is installed on the rotational shaft 115 that rotates at an angle in response to the rotation of the bucket 111.

The bucket position judging unit 330 judges whether the position of the bucket 111 detected by the bucket position detecting unit 320 is a loading position 301 or a maximum crowd position locked in a crowd direction from a maximum dump position. The bucket position judging unit 330 judges whether the position of the bucket 111 is the position of the bucket 111 corresponding to on and off operation sections of the detent bucket position holding unit 310 which is classified in advance. Herein, the on and off operation sections of the detent bucket position holding unit 310 which is classified in advance will be described in detail in FIG. 5. Further, the bucket position judging unit 330 may change the loading position 301 or the maximum crowd position. This may change a detent position of the bucket 111 according to an operator's request to operate the wheel loader or a working environment. The bucket position judging unit 330 may judge the position of the bucket 111 according to the changed classification position of the bucket 111.

The bucket detent controlling unit 340 controls the supply of a power 341 of the bucket position holding unit 310 according to the position of the bucket 111 judged by the bucket position judging unit 330. In detail, the bucket detent controlling unit 340 supplies or interrupts the power 341 of the bucket position holding unit 310 according to whether the position of the bucket 111 is between a section between the maximum dump position or the maximum crowd position and a tolerance of each section based on the loading position 301. Herein, when the tolerance is controlled to be locked by the bucket detent controlling unit 340 while the bucket 111 moves, the tolerance means a section in which the bucket 111 may stop from a detent moment to the loading position 301, the full dump position 201, and the full crowd position 203. For example, the bucket detent controlling unit 340 includes a power control circuit for controlling the bucket position holding unit 310 and may output a corresponding power control signal.

Figure 4:
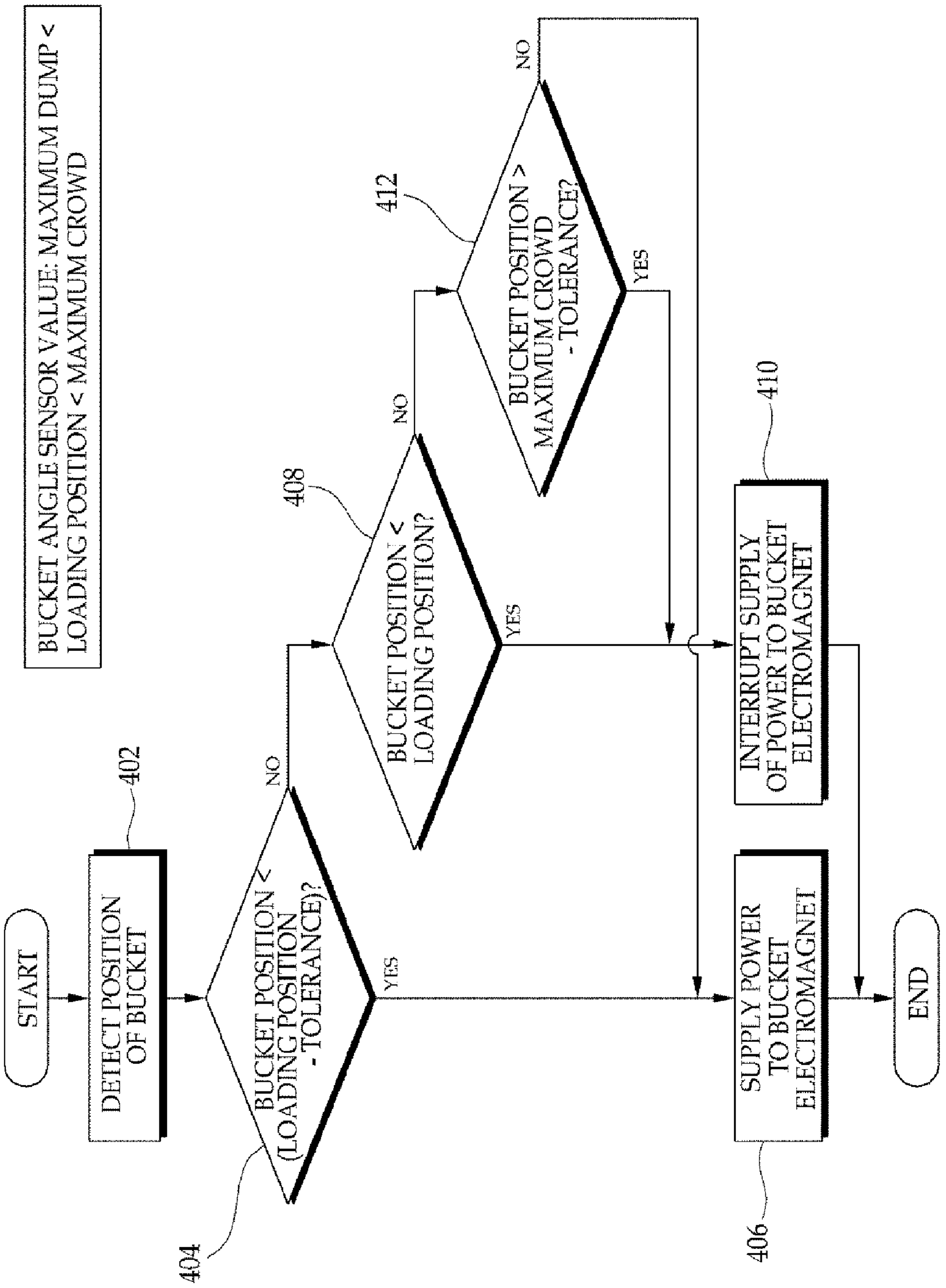
FIG. 4 is a flowchart of an exemplary embodiment of a full crowd detent method of a wheel loader bucket according to the present disclosure.

FIG. 4 is a flowchart of an exemplary embodiment of a full crowd detent method of a wheel loader bucket according to the present disclosure.

The bucket position detecting unit 320 detects the position of the bucket 111 by acquiring the bucket angle value sensed by the rotary angle sensor 321 capable of detecting the position of the bucket 111 (402).

In addition, the bucket position judging unit 330 verifies whether the position of the bucket 111 detected by the bucket position detecting unit 320 is less than a position (hereinafter, referred to as a 'first tolerance position') acquired by subtracting the tolerance from the loading position 301 which is classified in advance (404).

As the verification result (404), when the detected position of the bucket 111 is less than the first tolerance position, the bucket detent controlling unit 340 supplies the power 341 of the bucket position holding unit 310 (406).

On the contrary, as the verification result (404), when the detected position of the bucket 111 is equal to or more than the first tolerance position which is classified in advance, the bucket position judging unit 330 verifies whether the position of the bucket 111 detected by the bucket position detecting unit 320 is less than the loading position 301 which is classified in advance (408).

As the verification result (408), when the detected position of the bucket 111 is less than the loading position 301 which is classified in advance, the bucket detent controlling unit 340 interrupts the supply of the power 341 of the bucket position holding unit 310 (410).

On the contrary, as the verification result (408), when the detected position of the bucket 111 is equal to or more than the loading position 301 which is classified in advance, the bucket position judging unit 330 verifies whether the position of the bucket 111 detected by the bucket position detecting unit 320 is more than a position (hereinafter, referred to as a 'second tolerance position') which is smaller than the maximum crowd position by the tolerance (410).

As the verification result (412), when the detected position of the bucket 111 is more than the second tolerance position, the bucket detent controlling unit 340 performs the process "410" to interrupt the supply of the power 341 of the bucket position holding unit 310.

As the verification result (412), when the detected position of the bucket 111 is equal to or less than the second tolerance position, the bucket detent controlling unit 340 performs the process "406" to supply the power 341 of the bucket position holding unit 310.

Figure 5:
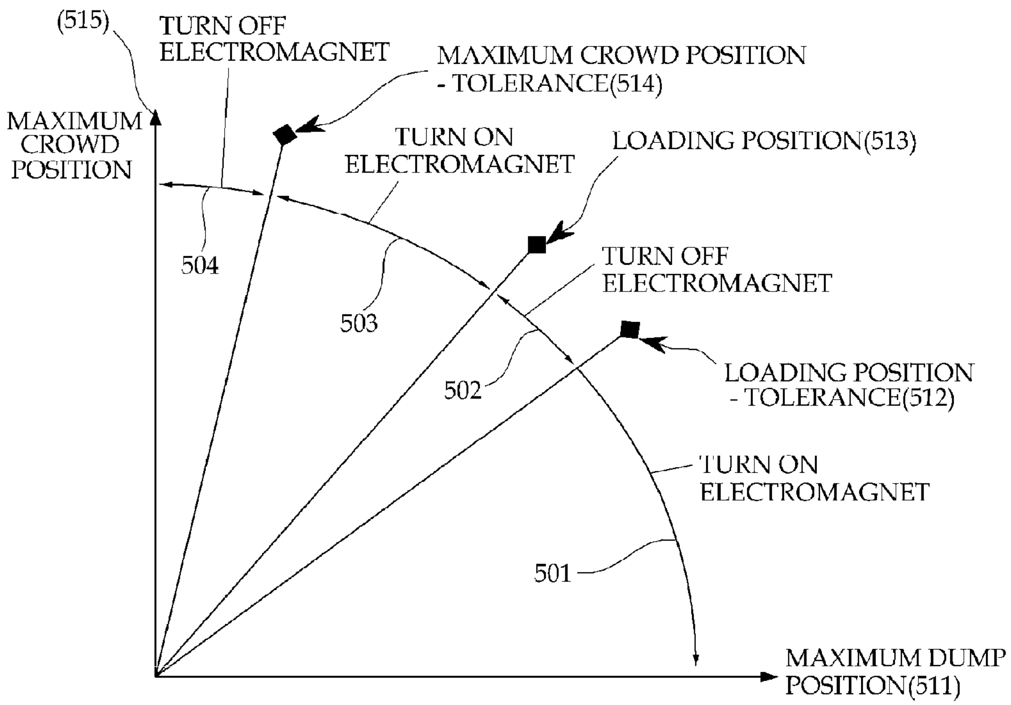
FIG. 5 is an explanatory diagram of an exemplary embodiment of on and off operation sections of a detent bucket position holding unit of FIG. 3 according to the present disclosure.

FIG. 5 is an explanatory diagram of an exemplary embodiment of on and off operation sections of a detent bucket position holding unit of FIG. 3 according to the present disclosure.

As shown in FIG. 5, when the operator classifies an operation to raise or drop to the bucket 111 of the wheel loader to the transportation means, the operation is classified into first and second on sections 501 and 503 in which the electromagnet 123 is turned on and first and second off sections 502 and 504 in which the electromagnet 123 is turned off. The first and second off sections 502 and 504 in which the electromagnet 123 is turned off are constants determined by a test.

In detail, the first section 501 where the electromagnet 123 is turned on is from a maximum dump position 511 of the bucket 111 to a first tolerance position 512.

The first section 502 in which the electromagnet 123 is turned off is from the first tolerance position 512 to a loading position 513.

The second section 503 in which the electromagnet 123 is turned on is from the loading position 513 to a second tolerance position 514.

The second section 504 in which the electromagnet 123 is turned off is from the second tolerance position 514 to a maximum crowd position 515.

The bucket position judging unit 330 judges whether the position of the bucket 111 corresponds to any one section between the first and second on sections 501 and 503 in which the electromagnet 123 is turned on and the first and second off sections 502 and 504 in which the electromagnet 123 is turned off, which are shown in FIG. 5.

Then, the bucket detent controlling unit 340 controls the supply of the power 341 to the bucket position holding unit 310 according to the section judged by the bucket position judging unit 330. As the judgment result, when the position of the bucket 111 is the first and second on sections 501 and 503, the bucket detent controlling unit 340 supplies the power 121 to the electromagnet 123. On the contrary, as the judgment result, when the position of the bucket 111 is the first and second off sections 502 and 504, the bucket detent controlling unit 340 interrupts the supply of the power 121 to the electromagnet 123.

From the foregoing, it will be appreciated that various embodiments of the present disclosure have been described herein for purposes of illustration, and that various modifications may be made by those skilled in the art without departing from the scope and spirit of the present disclosure. Therefore, the exemplary embodiments disclosed in the specification of the present disclosure do not limit the present disclosure. The scope of the present disclosure should be analyzed by the appended claims and it should be analyzed that all arts in the equivalent scope are included in the scope of the present disclosure.

A wheel loader detent function in the related art cannot provide a detent function in a full crowd operation, and as a result, the wheel loader detent function in the related art has a difficulty that an operator should move a handle of a wheel loader and a joystick lever simultaneously, but the present disclosure can improve operator's joystick operation convenience by providing a full crowd detent function to full-crowd a bucket without operator's gripping a bucket operating joystick lever from a maximum dump position of the bucket up to a completion moment of a maximum full-crowd operation.

The invention claimed is:

1. A full crowd detent apparatus of a wheel loader bucket, comprising:

a bucket position holding unit configured to latch a joystick lever operating a bucket while a power is supplied;

a bucket position detecting unit configured to detect the position of the bucket by acquiring a bucket angle value from an angle sensor detecting a rotational angle of the bucket;

a bucket position judging unit configured to judge whether the detected position of the bucket is within or second on operation sections, corresponding respectively to bucket positions within a range from a maximum dump position to a loading position and to bucket positions within a range from the loading position to a full crowd position, in which an electromagnet of the bucket position holding unit is turned on, and whether the detected position of the bucket is within first or second off operation sections, corresponding respectively to the loading position and the full crowd position, in which the electromagnet of the bucket position holding unit is turned off; and a bucket detent controlling unit configured to supply the power when the judged position of the bucket is within the first or second on operation sections and interrupt the power when the judged position of the bucket is within the first or second off operation sections.

2. The full crowd detent apparatus of a wheel loader bucket of claim 1, wherein the bucket position judging unit judges whether the position of the bucket is within the first or second on operation sections or within the first or second off operation sections of the power by considering a first tolerance position acquired by subtracting a tolerance from the loading position and a second tolerance position acquired by subtracting the tolerance from the maximum crowd position.

3. The full crowd detent apparatus of a wheel loader bucket of claim 2, wherein the bucket position judging unit judges that the position of the bucket is within the first or second off operation sections of the power when the position of the bucket is respectively between the loading position and the first tolerance position or between the maximum crowd position and the second tolerance position.

4. The full crowd detent apparatus of a wheel loader bucket of claim 1, wherein the bucket position detecting unit detects the position of the bucket by acquiring a bucket angle value from an angle sensor installed on at least one rotational shaft to operate the bucket.

5. A full crowd detent method of a wheel loader bucket, comprising:

detecting, using a bucket position detecting unit, a position of a bucket by acquiring a bucket angle value sensed by a rotary angle sensor capable of detecting the position of the bucket;

judging, using a bucket position judging unit, whether the detected position of the bucket is within first or second on operation sections, corresponding respectively to bucket positions within a range from a maximum dump position to a loading position and to bucket positions within a range from the loading position to a full crowd position, in which an electromagnet of the bucket position holding unit is turned on;

supplying, using a bucket detent controlling unit, a power when the judged position of the bucket is within the first or second on operation sections;

judging, using the bucket position judging unit, whether the detected position of the bucket is within first or second off operation sections, corresponding respectively to the loading position and the full crowd position, in which the electromagnet of the bucket position holding unit is turned off; and interrupting, using the bucket detent controlling unit, the power when the judged position of the bucket is within the first or second off operation sections.

6. The full crowd detent method of a wheel loader bucket of claim 5, wherein judging whether the detected position of the bucket is within the first or second on operation sections, using the bucket position judging unit, comprises judging that the position of the bucket is within the first or second on operation sections by considering a first tolerance position acquired by subtracting a tolerance from the loading position and a second tolerance position acquired by subtracting the tolerance from the maximum crowd position.

7. The full crowd detent apparatus of a wheel loader bucket of claim 6, wherein judging whether the detected position of the bucket is within the first or second off operation sections, using the bucket position judging unit, comprises judging that the position of the bucket is within the first or second off operation sections of the power when the position of the bucket is respectively between the loading position and the first tolerance position or between the maximum crowd position and the second tolerance position.

* * * * *